Aug. 27, 1963 R. B. BLIZARD 3,102,251
ACOUSTIC LOGGING APPARATUS
Filed Oct. 30, 1959 2 Sheets-Sheet 2

Robert B. Blizard
INVENTOR.

BY Donald H. Fidler
ATTORNEY

3,102,251
ACOUSTIC LOGGING APPARATUS
Robert B. Blizard, Houston, Tex., assignor to Schlumberger Well Surveying Corporation, Houston, Tex., a corporation of Texas
Filed Oct. 30, 1959, Ser. No. 849,890
12 Claims. (Cl. 340—18)

This invention relates to acoustic logging apparatus and, more particularly, apparatus for measuring the attentuation of acoustic energy traveling between spaced locations in media adjacent to a well bore.

In acoustic logging apparatus commonly employed to measure the acoustic velocity of acoustic energy traveling between spaced locations in media adjacent to a well bore, an acoustic transmitter and spaced receivers are arranged to be passed through a bore containing a fluid. The transmitter is periodically energized thereby to emit pulses of acoustic energy which travel through the fluid in the bore and through adjacent media at a velocity which is related to the type of media through which it travels. The bore may be either uncased or cased. A velocity value for bore fluid, casing and earth formation, for example, is about 5000 f.p.s. while a steel casing has a velocity value of about 17,000 feet per second and earth formations may have a velocity value ranging generally between 5,000 and 25,000 feet per second. Stated in terms of travel time, that is, in a time measurement per unit of distance acoustic energy typically travels through a foot of borehole fluid in 200 microseconds; a foot of steel in 57 microseconds; and a foot of earth formations in the range of 40 to 200 microseconds.

At the spaced locations from the transmitter the acoustic receivers respond to acoustic energy arriving at the respective receivers and develop electrical signals, the time interval between the developed electrical signals from the receivers being measured to provide an indication from which the velocity and an identification of the media may be derived.

Also from velocity indications, a measure of porosity may be obtained by the use of the following equation:

$$\frac{1}{V_{ind}} = \frac{\theta}{V_{liquid}} + \frac{1-\theta}{V_m}$$

where $V_{ind}$ is the velocity indication derived in feet per second; $V_{liq}$ is the acoustic velocity of interstitial liquid in feet per second; $V_m$ is the acoustic velocity of the material constituting the grains of rock in feet per second; and $\theta$ is the fractional porosity. However, this equation is generally applicable only for intergraular type (soft) formations having more or less uniformly distributed pores. Thus, velocity measuring apparatus provides indications of the type of media encountered and, in certain instances, a porosity value.

Attenuation of acoustic energy is also quite significant, especially attenuation resulting when the energy is passed through earth formations having fractures or vugs which contain water or oil, or more notably, gas.

In the case of formations of the intergranular type, attenuation of the acoustic energy has been found to have a relationship with grain size, the larger the grain size, the greater the attenuation. Again, in a cased borehole in which the cement is properly bonded to the casing and bore wall, the acoustic energy traveling through the casing is very greatly attenuated by dissipation through the cement and bore wall. In contrast, almost perfect transmission is obtained when the casing is "free," that is, unbonded.

Hence, it will be appreciated that attenuation measurements of acoustic energy provides useful information of various types.

Accordingly it is an object of the present invention to provide new and improved systems for measuring attenuation of acoustic energy in media through which a bore extends.

It is another object of the present invention to provide new and improved systems of determining attenuation of acoustic energy in bores extending through earth formations.

Still another object of the present invention is to provide new and improved systems for measuring attenuation of acoustic energy in media by deriving indications of a ratio of the strength of the acoustic energy at spaced locations.

In conjunction with the present invention, it has been established that a definite relationship exists between the decrease in the amplitude of a plane acoustic wave as a function of the distance traveled by it. This relationship is expressed by the formula:

$$A = A_0 e^{-\alpha x} \tag{1}$$

where $A_0$ is amplitude of the energy at a first location, $A$ is the amplitude at a second location, $\alpha$ is the attenuation constant and $x$ is the distance along the media between the first and second locations. Thus, the exponential relationship which exists between the distance and the amplitude may be rewritten in the form:

$$\log \frac{A_0}{A} = \alpha x \tag{2}$$

To express the attenuation in decibels per foot, the normal unit of attenuation measurement, use is made of the relationship:

$$\beta x = \text{attenuation in decibels} = 20 \log A_0/A \tag{3}$$

where $x$ is measured in feet and $\beta$ is the attenuation constant in decibels per foot.

It should be noted that in the case of non-plane waves as in a bore, sound may be considered to radiate from a point source so that there is a further decrease in amplitude due to the spreading out of the energy as it propagates away from the source. This effect, however, is essentially the same for all media and therefore only introduces an additional apparent attenuation constant which is easily subtracted from the measured attenuation constant to obtain the true attenuation constant $\alpha$. Thus, in the present invention, attenuation indications are obtained which are consistent with Equation 3 above, the additional apparent attenuation being subtracted from the measured attenuation constant.

In the present invention, acoustic energy is periodically emitted at first locations along the borehole and received at second and third locations which are spaced from the first location and one another along the borehole. A sensible indication of a function of the amplitude of the acoustic energy at the second and third locations is obtained and an indication of the attenuation is obtained by combining the sensible indications in a predetermined manner.

Apparatus to provide attenuation indications in decibels according to the invention includes circuitry-producing pulses spaced from one another thereby providing a time interval or time measurement which is representative of the ratio of the voltage amplitudes measured at the spaced locations. The time interval or measurement may then be calibrated to provide indications of attenuation for a unit distance. The circuitry includes amplitude measuring devices coupled to each of a pair of spaced receivers and arranged to develop signals decaying in accordance with predetermined functions from the peak amplitudes of the acoustic signal at the receivers. More particularly, a peak amplitude of an electrical signal representative of the acoustic signal at a first location is sensed by an amplitude measuring device and after the peak has been reached, the output of the device decays exponentially in accordance with a given time constant. At a second location, a peak amplitude of an electrical signal representative of the acoustic signal is sensed by another amplitude measuring device and develops an output which decays exponentially in accordance with a given time constant. By suitably combining the decaying outputs of the amplitude sensing devices, the time interval between sensing of the first peak at the first location and the instant when the decay function outputs of the devices are equal provides an indication of attenuation.

The novel features of the present invention are set forth with particularity in the appended claims. The present invention, both as to its organization and manner of operation together with further objects and advantages thereof, may best be understood by way of illustration and example of certain embodiments when taken in conjunction with the accompanying drawings in which:

Figure 1:
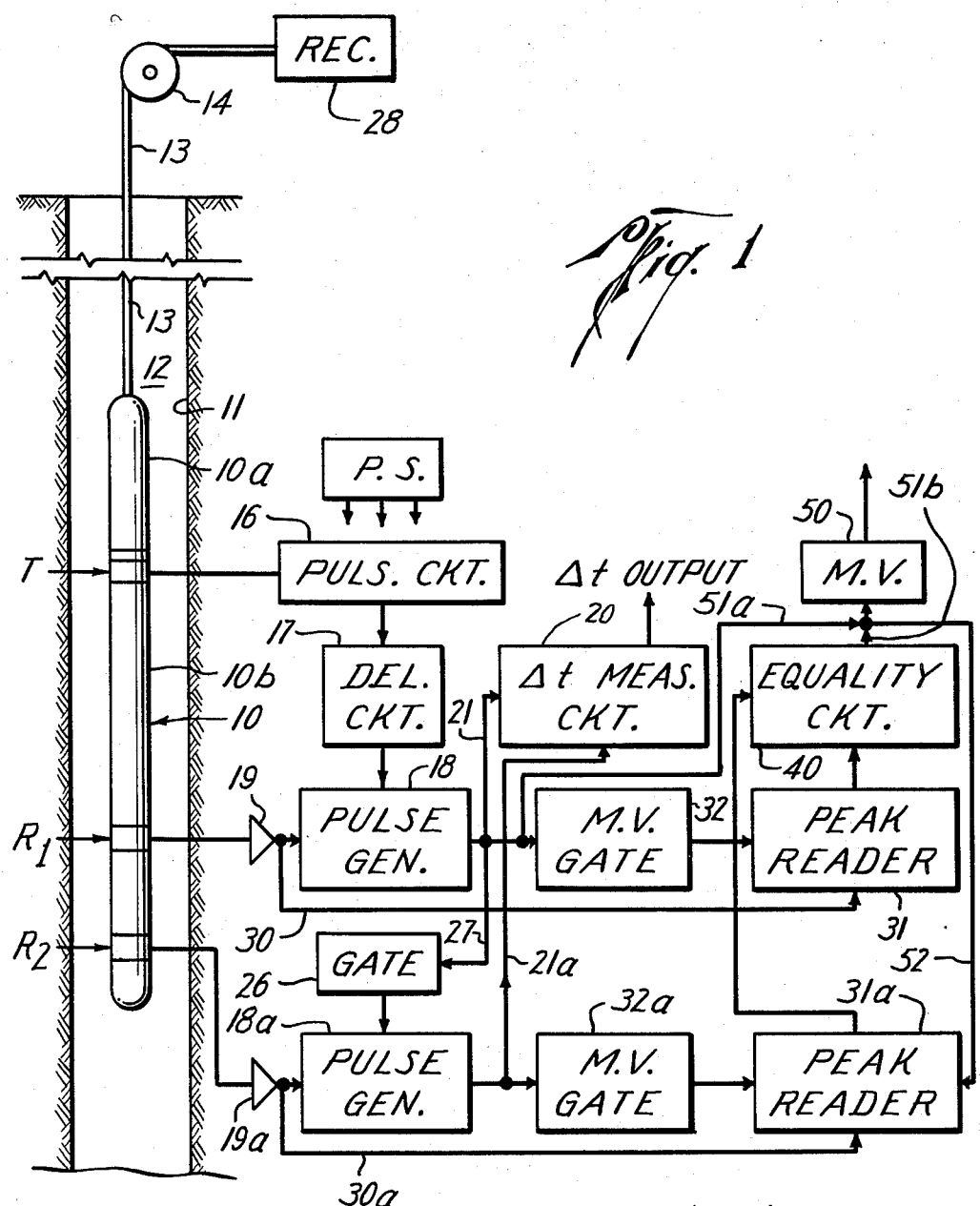
FIG. 1 illustrates a section of the earth as well as a schematic diagram of a sonic logging system which includes apparatus embodying the present invention.

Referring now to FIG. 1, apparatus 10 embodying the present invention is shown suspended in a bore 11 containing a usual borehole fluid 12 by means of a cable 13 and winch 14 arranged in a customary manner to transport the apparatus through the bore. The apparatus 10 includes an upper, fluid-tight cartridge section 10a for housing the electrical assemblies necessary for the operation of the apparatus (shown in diagram form to the right of the apparatus) and a lower section 10b in which an acoustic transmitter T and a pair of receivers $R_1$, $R_2$ are mounted. Receivers $R_1$ and $R_2$ are spaced from one another and from the transmitter T and may be, for example, either magnetostrictive or electrostrictive transducers constructed and carried by a support in a customary fashion.

In the electrical assemblies, a pulser circuit 16 is provided to trigger the transmitter T at periodic intervals, the transmitter emitting, each time it is energized, a pulse or burst of acoustic energy which radiates outwardly from the transmitter through the borehole fluid 12 into the adjacent media about the bore 11. When a pulse of acoustic energy traveling through the media arrives at a receiver, for example receiver $R_1$, the receiver responds to develop an electrical signal representative of the acoustic energy. Similarly, at a later time, the pulse of acoustic energy will arrive at receiver $R_2$, and receiver $R_2$ similarly develops an electrical signal representative of the acoustic energy. The time interval between the arrival of a pulse of acoustic energy at the receivers $R_1$ and $R_2$ is measured and, since the span between the receivers is a fixed distance, a velocity indication for the media investigated may be obtained.

Apparatus to measure the time interval $\Delta t$ includes a delay circuit 17 rendered operative simultaneously with actuation of the transmitter T by pulser circuit 16 to provide a fixed time delay during which the receiver circuits are inoperative, thereby eliminating errors in the time measurement due to premature response. After the fixed time delay, the delay circuit 17 operatively conditions a pulse generator 18 so that it may be triggered by an electrical signal from the first receiver $R_1$. The pulse generator 18 is in a first channel circuit and has an input circuit coupled by way of an amplifier 19 to the receiver $R_1$ and an output circuit coupled to a $\Delta t$ measuring circuit 20 as indicated by the lead 21.

After the pulse generator 18 is operatively conditioned and a pulse of acoustic energy arrives at the receiver $R_1$ thereby developing an electrical signal, the electrical signal is amplified by amplifier 19 and applied to the pulse generator 18. The electrical signal generally consists of positive and negative "swings" of varying amplitude as shown by the waveform 22 in dashed line in FIG. 4. Detection of the signal in the pulse generator 18 is accomplished by providing a bias level 23 (FIG. 4) so that when the amplitude of the signal exceeds the level 23, the pulse generator 18 provides a single output pulse or time marker at a time $t_0$, which is supplied to the $\Delta t$ measuring circuit 20. The first three "swings" of the electrical signal have been found to have the most "character" in that they are relatively free of distortion as compared to the fourth and subsequent "swings" of the electrical signal developed and they are fairly consistent in repeatability and reliability as indicators of travel time. Since the second and third "swings" are relatively large compared to the first "swing," detection of the second or third "swing" will generally eliminate errors due to triggering on small amplitude "noise" signals.

The output pulse or time marker from the pulse generator 18 is also supplied to a gate circuit 26 by a lead 27, which circuit, in turn, operatively conditions another pulse generator 18a. The pulse generator 18a is in a second channel circuit and has an input circuit coupled via an amplifier 19a to the receiver $R_2$ and an output circuit coupled by a lead 21a to the $\Delta t$ measuring circuit 20. Hence, when the pulse generator 18a is operatively conditioned after the arrival of acoustic energy at the first receiver $R_1$, the subsequent arrival of the acoustic energy at the receiver $R_2$ develops an electrical signal which has an amplitude sufficient to exceed a bias level in the pulse generator 18a so that an output pulse or time marker is supplied to the $\Delta t$ measuring circuit 20. The time interval between the pulse outputs of pulse generators 18 and 18a is converted into a voltage amplitude signal by circuit 20 which is supplied to a recorder 28 at the earth's surface via cable 13 to provide indications of the $\Delta t$ of the formations.

The time-to-amplitude conversion may be accomplished, for example, by a multivibrator which provides a pulse output in response to the pulse outputs of pulse generators 18 and 18a to control the charging of a capacitor from a constant current source, the output of the capacitor being coupled to a cathode follower. The recorder 28, of course, is provided with a recording medium which is transported in a controlled relationship to the movement of the apparatus 10 through the bore 11 so that the indications are correlated with the level to which they are related.

It will be appreciated from the foregoing description that in each signal channel, the developed electrical signal from a receiver triggers a pulse generator to produce a pulse output and the time interval between the pulse outputs is measured to provide a velocity indication for the interval of media intermediate of the receivers $R_1$ and $R_2$.

In accordance with the present invention, the peak amplitudes of a single "swing" of the developed electrical signals are sensed and a function of the signals is developed. From the functions of the signals, indications can be obtained of the time interval between the time at which a peak amplitude occurs at the first receiver and the time at which the functions of the signal are equal thereby representing the ratio of the peak amplitudes. To accomplish this, the electrical signal from receiver $R_1$ is supplied by amplifier 19 in the first receiver channel via a lead 30 to a peak reading device 31 which is time gated by a gate circuit 32. Gate circuit 32 is responsive to the pulse output or time marker of the pulse generator 18 to develop a short time gate, of, say, 15 microseconds so that, when triggered, the "swing" of the signal which precipitates the pulse output is also passed to the peak reading device. Such device, in turn, ative of acoustic pulses arriving at said second and third locations, developing decay functions of peak amplitude values of said developed signals at said second and third locations, and deriving indications of the time interval between the time at which a peak amplitude occurs at the second location and the time at which the value of the decay functions are equal.

2. A method of well logging which comprises probing with acoustic pulses earth segments of constant length by periodically causing an emission of an acoustic signal at first locations along the bore and sensing the arrival of the acoustic pulse at second and third locations along the bore at a fixed distance from one another and from said first locations, developing signals representative of acoustic pulses arriving at said second and third locations, developing decay functions of peak amplitude values of said developed signals at said second locations which decay in a given time to a given value, developing decay functions of peak amplitude values of said developed signals at said third locations which decay in said given time to said given value, and deriving indications of the time intervals between the time at which a peak amplitude occurs at the second location and the time at which the value of the decay functions are equal to said given value.

3. A method of well logging which comprises probing with acoustic pulses earth segments of constant length by periodically causing an emission of an acoustic signal at first locations along the bore and sensing the arrival of the acoustic pulse at second and third locations along the bore at a fixed distance from one another and from said first locations, developing signals representative of acoustic pulses arriving at said second and third locations, developing decay functions of selected peak amplitude values of said developed signals at said second locations which decay in a given time to a given value, developing an indication of arrival of acoustic energy at said second location, developing decay functions of peak amplitude values of said developed signals at said third locations which decay in a given time to a given value, and deriving indications of the time intervals between the indicated time of arrival of acoustic energy at said second location and the time at which the value of the decay functions reach said given value.

4. An acoustic exploring unit for well bores including an acoustic transmitter for periodically emitting pulses and acoustic receivers spaced from one another and from said transmitter, said receivers being responsive to acoustic pulses for developing electrical signals representative of the received acoustic energy, a sensing system coupled to said receivers including means responsive to electrical signals developed by a first receiver adjacent to said transmitter for producing a first time marker in response to a selected representative strength value of acoustic energy at said first receiver, means respectively coupled to said receivers for deriving signals which are predetermined functions of representative strength values of acoustic energy at said acoustic receivers, and means coupled to said signal deriving means for combining said predetermined functions for producing a second time marker at an instant of time related to the combined predetermined functions such that the time interval between said time markers is proportional to the ratio of the strengths of the acoustic energy at said acoustic receivers.

5. An acoustic exploring unit for well bores including an acoustic transmitter for periodically emitting pulses and acoustic receivers spaced from one another and from said transmitter, said receivers being responsive to acoustic pulses for developing electrical signals representative of the acoustic energy at the respective receivers, a sensing system coupled to said receivers including means responsive to electrical signals developed by a first receiver adjacent to said transmitter for producing a first time marker in response to a selected representative amplitude of acoustic energy at said first receiver, and means respectively coupled to said receivers for deriving signals which are predetermined functions of representative amplitudes of acoustic energy at said receivers, means coupled to said signal deriving means for combining said predetermined functions for producing a second time marker at an instant of time related to the combined functions such that the time interval between time markers is proportional to the attenuation of the amplitudes of the acoustic energy at said receivers.

6. A well logging system for use in a borehole which comprises a support; an acoustic transmitter carried by said support; first and second acoustic receivers carried by said support and spaced at a fixed distance from said transmitter and from one another for developing electrical signals in response to acoustic energy; peak reading means coupled to said first receiver to obtain a first peak amplitude of an electrical signal and including a first time constant circuit which permits a peak amplitude obtained to decay exponentially thereby developing a first output signal; peak reading means coupled to said second receiver to obtain a second peak amplitude of an electrical signal and including a second time constant circuit which permits a peak amplitude obtained to decay exponentially thereby developing a second output signal, said second time constant circuit having a longer time constant than the time constant of said first time constant circuit; and means responsive to an equality of the output signals of said peak reading means for developing a pulse output at a time when the output signals are equal and wherein the time interval between the time of occurrence of equal output signals and the time of occurrence of the first peak amplitude is proportional to the relative attenuation of the peak amplitudes of the electrical signals developed by respective receivers.

7. A well logging system for use in a borehole which comprises a support; an acoustic transmitter carried by said support; first and second acoustic receivers carried by said support and spaced at a fixed distance from said transmitter and from one another for developing electrical signals in response to acoustic energy; peak reading means coupled to said first receiver to obtain a first peak amplitude of an electrical signal and including a first time constant circuit which permits a peak amplitude obtained to decay exponentially thereby developing a first output signal; means coupled to said first receiver to develop a first pulse output substantially at the time of occurrence of said first peak amplitude; peak reading means coupled to said second receiver to obtain a second single peak amplitude of an electrical signal and including a second time constant circuit which permits a peak amplitude obtained to decay exponentially thereby developing a second output signal, said second time constant circuit having longer time constant than the time constant of said first time constant circuit; and means responsive to an equality of the output signals of said peak reading means for developing a second pulse output wherein the time interval between said first and second pulse outputs is proportional to the attenuation of the peak amplitudes.

8. A well logging system for use in a borehole which comprises: a support; an acoustic transmitter carried by said support; first and second acoustic receivers carried by said support and spaced at a fixed distance from said transmitter and from one another, said receivers being arranged for developing electrical signals in response to acoustic energy; a first electrical channel circuit including means coupled to said first receiver for generating a first marker for a selected amplitude of an electrical signal, and first peak reading means coupled to said first receiver for sensing the peak amplitude of an electrical signal immediately succeeding said time marker and further including a first time constant circuit which permits the peak amplitude obtained to decay exponentially thereby developing a first output signal; a second electrical channel circuit including second peak reading means includes circuit means to sense the peak value of the signal and obtain a function of the signal for a period of time.

Figure 2:
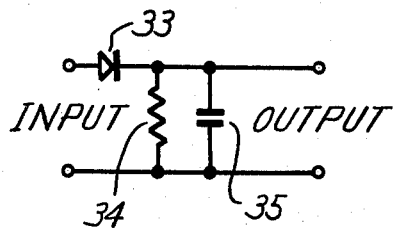
FIG. 2 is a simplified circuit diagram of apparatus for use with the present invention.

Circuit means to sense the peak value are shown in FIG. 2. It will be appreciated that a gated, single positive swing of the voltage signal applied to the input terminals will develop a unidirectional current flow through diode 33 and resistance 34 which are connected across the input terminals. The current flow charges a capacitor 35 (of value C) shunt-connected to the resistance 34 (of value R) to the peak voltage attained and the time constant RC is such that the voltage signal decays slowly over a period of time. The time constant for the circuit determines the output voltage signal across the output terminals and a relatively long time constant permits the output voltage signal generally to assume the configuration indicated by the waveform 37 in FIG. 4(a).

As shown in FIG. 4(a), the second "swing" of waveform 22 exceeds bias level 23 at the time $t_0$ and the time marker of pulse generator 18 is developed at this time. Waveform 37 decays from the peak voltage $E_1$ which is reached at time $t_1$ in accordance with the formula:

$$E = E_1 e^{-b_1 t} \quad (4)$$

where E is the voltage at a time $t$, $E_1$ is the peak voltage attained, and $b_1$ is a decay constant equal to $$\frac{1}{RC}$$

where R is resistance and C is capacitance.

Figure 4:
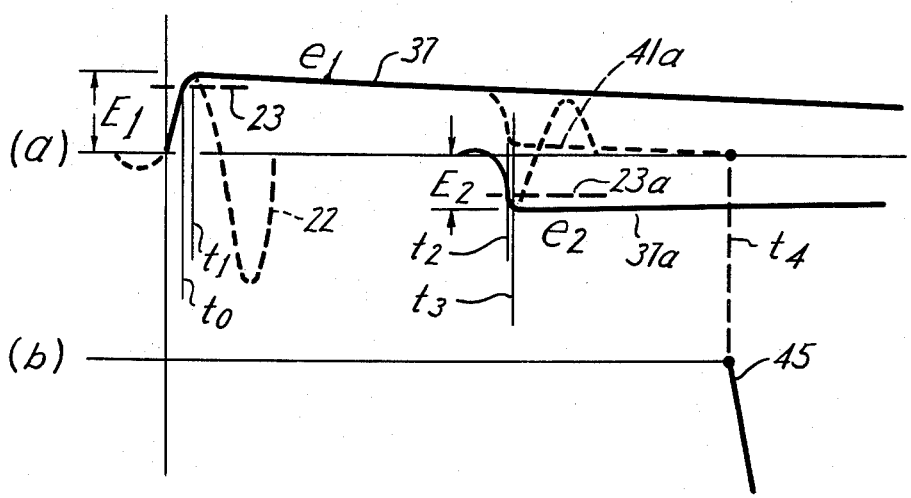
FIG. 4 depicts waveforms of electrical signals in the system illustrated for a better understanding of the present invention.

In the second receiver channel, the developed signal from receiver $R_2$ is supplied via a lead 30a to a peak reading apparatus 31a which is time gated by a gate circuit 32a. Gate circuit 32a is responsive to the pulse output of pulse generator 18a so that when triggered, a swing of the signal is passed to the peak reading device 31a which similarly includes means to sense the peak value as above described. The waveform 37a (FIG. 4, shown reversed in polarity) from apparatus 31a is developed at a time $t_2$ when the swing of the signal exceeds the bias level 23a of pulse generator 18a, the waveform reaching a peak at the time $t_3$ and thereafter decaying in accordance with the formula:

$$E = E_2 e^{-b_2 t}$$

where $E_2$ is the peak voltage obtained and $b_2$ is a decay constant equal to $$\frac{1}{RC}$$

It will be noted that, at time $t_3$, the voltage $E_1 e^{-b_2 t}$ is greater than the voltage $E_2$ and that the decay constants $b_1$ and $b_2$ are not the same.

By combining the voltage decay functions, an indication of the ratio of the peak amplitudes is obtained because the time interval between the peak voltage at the first receiver and the instant of time $t_4$ (FIG. 4(a)) where the two outputs or voltages of waveforms 37 and 37a are equal is, to a good approximation, given by the relationship:

$$t_4 - t_1 = \frac{1}{b_1 - b_2} \ln \frac{E_1}{E_2} \quad (6)$$

The relationship given by Equation (6) is proportional to the relationship of Equation (3). That is $(t_4 - t_1)$ is proportional to $\beta x$ and $$\frac{1}{b_1 - b_2} \ln \frac{E_1}{E_2}$$

is in the same form as $$20 \log \frac{A}{A_0}$$

so that the time interval between time markers at times $t_1$ and $t_4$ is an indication of attenuation in decibels.

Figure 3:
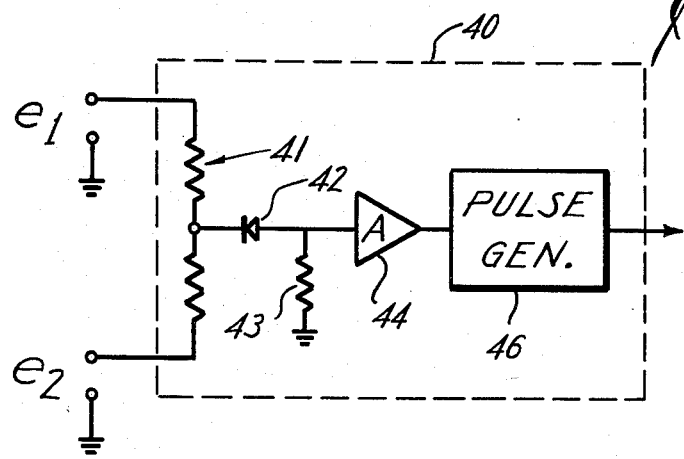
FIG. 3 is a schematic diagram of specific apparatus as embodied in the present invention.

To develop a time marker at time $t_4$, the voltage functions as shown by waveforms 37, 37a from the peak reading devices 31, 31a respectively are supplied to an equality circuit 40 shown in detail in FIG. 3. One of the waveforms 37 is positive with respect to a ground potential while the other waveform 37a is made negative with respect to a ground potential and a summing network 41 in circuit 40 adds the voltages as indicated by the dashed line waveform 41a in FIG. 4(a). Thus, at time $t_4$ where the sum of the voltages goes negative, that is, voltage $E_2 e^{-b_2 t}$ exceeds voltage $S_1 e^{-b_1 t}$, a diode 42 (FIG. 3) in the equality device 40 conducts, and the voltage developed across a resistance 43 is amplified by amplifier 44 to provide a sharp negative going signal 45 (FIG. 4(b)) which triggers a pulse generator 46 (FIG. 3) thereby producing an output pulse signal or time marker.

From the foregoing it will be seen that a pulse or time marker is produced at a time $t_0$ and a pulse output or time marker is produced by pulse generator 46 at the time $t_4$. The time duration between the time markers at times $t_0$ and $t_4$ is very nearly proportional to the logarithm of the ratio of the amplitudes which, in turn, is proportional to the attenuation constant. For a more accurate proportionality, the peak reading device may be provided with a pulse generator to develop an output pulse at the time $t_1$ where the peak voltage occurs; however, in practice, the time interval between times $t_0$ and $t_1$ is relatively small as compared to the time interval between $t_1$ and $t_4$ so that either time $t_0$ or $t_1$ can be employed as the initial time marker.

The pulses occurring at times $t_0$ and $t_4$ may be conveyed to surface equipment to derive an indication of the time interval or, as shown in FIG. 1, pulse generator 18 and pulse generator 46 (FIG. 3) may be coupled to a multivibrator 50 via leads 51a and 51b so that the multivibrator 50 produces an output pulse having a time duration equal to the time interval between the pulses at time $t_0$ and $t_4$. The time durations of the pulse output of multivibrator 50 may be converted in a conventional manner by an integrator, for example, into indications which are registered in the recorder 28.

The pulse output of pulse generator 46 is also supplied via lead 52 to a discharge circuit in peak reader device 31a which discharges the capacitor prior to the arrival of the next signal to be sensed.

From the foregoing description it will immediately become apparent that other arrangements to derive the attenuation are possible. For example, the time constant of peak reader device 31a while shown to be long enough to require a reset may be made shorter so as to discharge before the next energization. The shorter time constant in this instance would serve only to change the proportionality constant $$\frac{1}{b_1 - b_2}$$

Also should the gain in the amplification in one channel be greater than the other channel the time interval would be equal to the ratio of amplitudes times a constant factor.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

What is claimed is:

1. A method of well logging which comprises probing with acoustic pulses segments of constant length along a bore by periodically causing an emission of an acoustic signal at first locations along the bore and sensing the arrival of the accoustic pulse at second and third locations along the bore at a fixed distance from one another and from said first locations, developing signals representcoupled to said second receiver for sensing the peak amplitude of an electrical signal and including a second time constant circuit which permits the peak amplitude obtained to decay exponentially thereby developing a second output signal, the time constant of said second time constant circuit being longer than the time constant of said first time constant circuit; and means responsive to an equality of the output signals of said peak reading means for developing a second time marker wherein the time interval between the second time marker and the time of occurrence of the first marker is proportional to the attenuation of the peak amplitudes.

9. A well logging system for use in a borehole which comprises: a support; an acoustic transmitter carried by said support; first and second acoustic receivers carried by said support and spaced at a fixed distance from said transmitter and from one another, said receivers being arranged for developing electrical signals in response to acoustic energy; a first electrical channel circuit including means coupled to said first receiver for generating a first time marker for a selected amplitude of an electrical signal, first peak reading means coupled to said receiver for sensing the peak amplitude of an electrical signal immediately succeeding said time marker and including a first time constant circuit which permits the peak amplitude obtained to decay exponentially thereby developing a first output signal; a second electrical channel circuit including means coupled to said second receiver for generating a second time marker for a selected amplitude of the electrical signal, second peak reading means coupled to said second receiver for sensing the peak amplitude value of an electrical signal immediately succeeding said time marker and including a second time constant circuit which permits the peak value obtained to decay exponentially thereby developing a second output signal, said second time constant circuit having a longer time constant than said first time constant circuit; and means responsive to an equality of the output signals of said peak reading means for developing a third time marker wherein the time interval between said first and third time markers is proportional to the attenuation of the peak amplitudes and the time interval between said first and second time markers is proportional to the velocity of the acoustic energy.

10. A well logging system for use in a borehole which comprises: a support; an acoustic transmitter carried by said support; first acoustic and second acoustic receivers carried by said support and spaced at a fixed distance from said transmitter and from one another, said receivers being arranged for developing electrical signals in response to acoustic energy; a first electrical channel circuit including a first pulse generator coupled to said first receiver for generating a pulse output whenever the amplitude of an electrical signal exceeds a predetermined value, gating means coupled to said first pulse generator for generating a time gate pulse output in response to a pulse output from said pulse generator, first peak reading means coupled to said receiver for receipt of an electrical signal and responsive to said time gate pulse to obtain a first single peak amplitude of the signal and including a first time constant circuit which permits the peak amplitude obtained to decay exponentially thereby developing a first output signal; a second electrical channel circuit including a second pulse generator coupled to said second receiver for generating a pulse output whenever the amplitude of the electrical signal exceeds a predetermined value, second gating means coupled to said second pulse generator for generating a time gate pulse output in response to a pulse output from said second pulse generator, second peak reading means coupled to said second receiver for receipt of an electrical signal and responsive to said time gate pulse to obtain a second single peak amplitude of the signal and including a second time constant circuit which permits the peak amplitude obtained to decay exponentially thereby developing a second output signal, said second time constant circuit having a longer time constant than said first time constant circuit; and means responsive to an equality of the output signals of said peak reading means for developing a pulse output wherein the time interval between the time of occurrence of equal output signals and the time of occurrence of the first peak amplitude is proportional to the attenuation of the peak amplitudes.

11. A method of well-logging which comprises: probing with acoustic pulses segments of constant length along a bore by periodically causing an emission of an acoustic signal at first locations along the bore and sensing the arrival of such an acoustic signal at second and third locations along the bore at a fixed distance from one another and from said first locations, developing electrical signals representative of the strength of an acoustic signal arriving successively at said second and third locations, developing from the respective electrical signals at each of said second and third locations other signals with predetermined functions over a period of time of which functions are dependent upon the strength of such electrical signals, and combining said other signals to derive an indication of attenuation of acoustic energy between said second and third locations based upon a relationship between the predetermined functions of said other signals.

12. A well-logging tool for use in a well bore which comprises: a support; an acoustic transmitter carried by said support; first and second acoustic receivers carried by said support and spaced at a fixed distance from said transmitter and from one another, said receivers being arranged for developing electrical signals in response to acoustic energy; a first electrical channel circuit including means coupled to said first receiver for generating a first time marker in response to a first arrival of acoustic energy, first peak reading means coupled to said receiver for sensing the peak amplitude of an electrical signal and including a first time constant circuit which permits the peak amplitude obtained to decay exponentially thereby to develop a first output signal; a second electrical channel circuit including means coupled to said second receiver for generating a second time marker in response to acoustic energy, second peak reading means coupled to said second receiver for sensing the peak amplitude value of an electrical signal and including a second time constant circuit which permits the peak value obtained to decay exponentially thereby to provide a second output signal, said second time constant circuit having a longer time constant than said first time constant circuit; means responsive to the output signals of said peak reading means for developing a third time marker wherein the time interval between said first and third markers is proportional to the attenuation of the peak amplitudes and the time interval between said first and second time markers is proportional to the velocity of the acoustic energy.

References Cited in the file of this patent

UNITED STATES PATENTS

| 2,931,455 | Loofbourrow | Apr. 5, 1960 |
| 2,934,741 | Gray et al. | Apr. 26, 1960 |
| 2,938,592 | Charske et al. | May 31, 1960 |
| 2,949,973 | Broding et al. | Aug. 23, 1960 |
| 2,966,953 | Heintz | Jan. 3, 1961 |